(12) United States Patent
Wu et al.

(10) Patent No.: US 9,907,451 B2
(45) Date of Patent: Mar. 6, 2018

(54) DISHWASHER DRYING SYSTEM WITH THERMAL STORAGE HEAT EXCHANGER

(71) Applicant: Samsung Electronics Co., Ltd., Suwon-si (KR)

(72) Inventors: Guolian Wu, Mountain View, CA (US); Raveendran Vaidhyanathan, Mountain View, CA (US)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/149,823

(22) Filed: May 9, 2016

(65) Prior Publication Data
US 2017/0319045 A1    Nov. 9, 2017

(51) Int. Cl.
  F26B 5/04 (2006.01)
  A47L 15/48 (2006.01)
  A47L 15/14 (2006.01)
  A47L 15/42 (2006.01)

(52) U.S. Cl.
  CPC ............. *A47L 15/483* (2013.01); *A47L 15/14* (2013.01); *A47L 15/4225* (2013.01); *A47L 15/4246* (2013.01); *A47L 15/4251* (2013.01); *A47L 15/4257* (2013.01); *A47L 15/486* (2013.01); *F26B 5/04* (2013.01)

(58) Field of Classification Search
  CPC .......... F26B 5/04; A47L 15/483; A47L 15/14; A47L 15/4265; A47L 15/4246; A47L 15/4251; A47L 15/4257; A47L 15/486
  USPC ............................................................ 34/76
  See application file for complete search history.

(56) References Cited

U.S. PATENT DOCUMENTS

| 5,343,632 | A | 9/1994 | Dinh |
| 6,170,166 | B1 * | 1/2001 | Johansen ................ A47L 15/48 |
| | | | 34/595 |
| 7,367,134 | B2 * | 5/2008 | Osvatic .................... D06F 58/20 |
| | | | 137/514 |
| 7,676,954 | B2 * | 3/2010 | Classen ............... A47L 15/0013 |
| | | | 34/486 |
| 7,901,518 | B2 | 3/2011 | Berner et al. |
| 8,601,716 | B2 * | 12/2013 | Jerg ....................... A47L 15/481 |
| | | | 34/329 |
| 8,869,424 | B2 * | 10/2014 | Hermann ............ A47L 15/0034 |
| | | | 134/107 |
| 8,875,721 | B2 | 11/2014 | Bertsch et al. |
| 9,080,812 | B2 * | 7/2015 | Dreossi ................... F26B 21/08 |

(Continued)

FOREIGN PATENT DOCUMENTS

| EP | 2842475 A1 * | 3/2015 | ........... A47L 15/481 |
| KR | 20150026191 A * | 3/2015 | ........... A47L 15/481 |

*Primary Examiner* — Stephen M Gravini (57) ABSTRACT

A dishwasher drying system includes an air inlet configured to receive hot, humid air from a tub of a dishwasher. The dishwasher drying system also includes an air outlet configured to discharge the air to an ambient environment outside the dishwasher. The dishwasher drying system further includes an air moving device configured to cause the air to move from the air inlet to the air outlet. In addition, the dishwasher drying system includes a thermal storage heat exchanger positioned within an airflow path of the moving air, the thermal storage heat exchanger configured to absorb heat and condense moisture from the moving air as the moving air contacts the thermal storage heat exchanger during a dishwasher drying cycle.

20 Claims, 8 Drawing Sheets

(56) References Cited

U.S. PATENT DOCUMENTS

| | | | |
|---|---|---|---|
| 9,351,628 B2* | 5/2016 | Erozkan | A47L 15/486 |
| 9,462,929 B2* | 10/2016 | Park | A47L 15/481 |
| 9,480,388 B2* | 11/2016 | Hong | A47L 15/481 |
| 9,510,728 B2* | 12/2016 | Tuller | A47L 15/488 |
| 9,605,897 B2* | 3/2017 | Hyde | F26B 3/00 |
| 2006/0137214 A1* | 6/2006 | Achenbach | H05K 5/0213 34/468 |
| 2006/0231122 A1 | 10/2006 | Stelzer et al. | |
| 2006/0236556 A1 | 10/2006 | Ferguson et al. | |
| 2006/0278257 A1 | 12/2006 | Jerg et al. | |
| 2007/0295360 A1 | 12/2007 | Jerg et al. | |
| 2008/0283099 A1 | 11/2008 | Peukert et al. | |
| 2009/0038661 A1 | 2/2009 | Hildenbrand | |
| 2009/0158928 A1 | 6/2009 | Wu et al. | |
| 2010/0139714 A1 | 6/2010 | Alessandrelli | |
| 2010/0186776 A1 | 7/2010 | Bittner | |
| 2013/0008474 A1 | 1/2013 | Thayyullathil et al. | |
| 2013/0206186 A1 | 8/2013 | Tang et al. | |
| 2014/0059880 A1* | 3/2014 | Bertsch | A47L 15/0034 34/443 |
| 2014/0150286 A1 | 6/2014 | Jadhav et al. | |
| 2014/0238450 A1 | 8/2014 | Bertram et al. | |

\* cited by examiner

DISHWASHER DRYING SYSTEM WITH THERMAL STORAGE HEAT EXCHANGER

TECHNICAL FIELD

This disclosure relates generally to dishwasher appliances and more specifically to a dishwasher drying system with a thermal storage heat exchanger.

BACKGROUND

Dishwashers are used throughout the world to automate and reduce the effort associated with cleaning dishes. Most dishwashers incorporate a wash cycle, in which the dish load is washed with water and detergent, followed by a rinse cycle, in which the dish load is rinsed primarily with clean water. At the end of the rinse cycle, the air inside the dishwasher tub is typically hot and humid. This can lead to various issues in drying the dish load.

SUMMARY

This disclosure provides a dishwasher drying system with a thermal storage heat exchanger.

In a first embodiment, a dishwasher drying system is provided. The system includes an air inlet configured to receive hot, humid air from a tub of a dishwasher. The system also includes an air outlet configured to discharge the air to an ambient environment outside the dishwasher. The system further includes an air moving device configured to cause the air to move from the air inlet to the air outlet. In addition, the system includes a thermal storage heat exchanger positioned within an airflow path of the moving air, the thermal storage heat exchanger configured to absorb heat and condense moisture from the moving air as the moving air contacts the thermal storage heat exchanger during a dishwasher drying cycle.

In a second embodiment, a dishwasher is provided. The dishwasher includes a tub, a door, and a dishwasher drying system. The system includes an air inlet configured to receive hot, humid air from a tub of a dishwasher. The system also includes an air outlet configured to discharge the air to an ambient environment outside the dishwasher. The system further includes an air moving device configured to cause the air to move from the air inlet to the air outlet. In addition, the system includes a thermal storage heat exchanger positioned within an airflow path of the moving air, the thermal storage heat exchanger configured to absorb heat and condense moisture from the moving air as the moving air contacts the thermal storage heat exchanger during a dishwasher drying cycle.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 5A through 7B illustrate different examples of thermal storage heat exchangers that can be used in embodiments of this disclosure

DETAILED DESCRIPTION

FIGS. 1 through 7B, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Most dishwashers incorporate a wash cycle, in which the dish load is washed with water and detergent, followed by a rinse cycle, in which the dish load is rinsed primarily with clean water. At the end of the rinse cycle, the air inside the dishwasher tub is hot and humid. In many dishwashers, this air is discharged into the ambient. If the discharge is performed quickly over a short period of time, condensation of moisture may occur at the air outlet of the dishwasher and on surrounding surfaces, sometimes resulting in water droplets on the floor, and even (sometimes permanent) water damage to interior décor. If the discharge of hot and humid air is done slowly, it prolongs the drying time and the moisture may condense on the dish load, causing spots. Thus, existing processes and systems for discharging hot and humid air from the dishwasher tub either take too long for dish drying or potentially cause moisture condensation at the air outlet of the dishwasher.

To address these and other issues, embodiments of this disclosure provide a dishwasher system and process for rapidly discharging hot and humid air from a dishwasher at the end of a rinse cycle without the moisture condensing at the air outlet of the dishwasher, thus providing the user a fast dish drying feature.

The disclosed embodiments include a thermal storage heat exchanger that removes moisture from the hot and humid air before it is discharged into the ambient air outside the dishwasher. The thermal storage heat exchanger can include a phase change material (PCM) or non-phase change material. Depending on the embodiment, the temperature of the non-phase change material increases or the PCM changes from solid to liquid as the moisture condenses on the surface of the thermal storage heat exchanger. Later, the thermal storage heat exchanger is "recharged" or restored into its original state by rejecting heat to the ambient air when the dishwasher is idle.

The disclosed embodiments provide a number of advantageous benefits over conventional electric heating technology, including faster dish drying and minimal or no external condensation.

Figure 1:
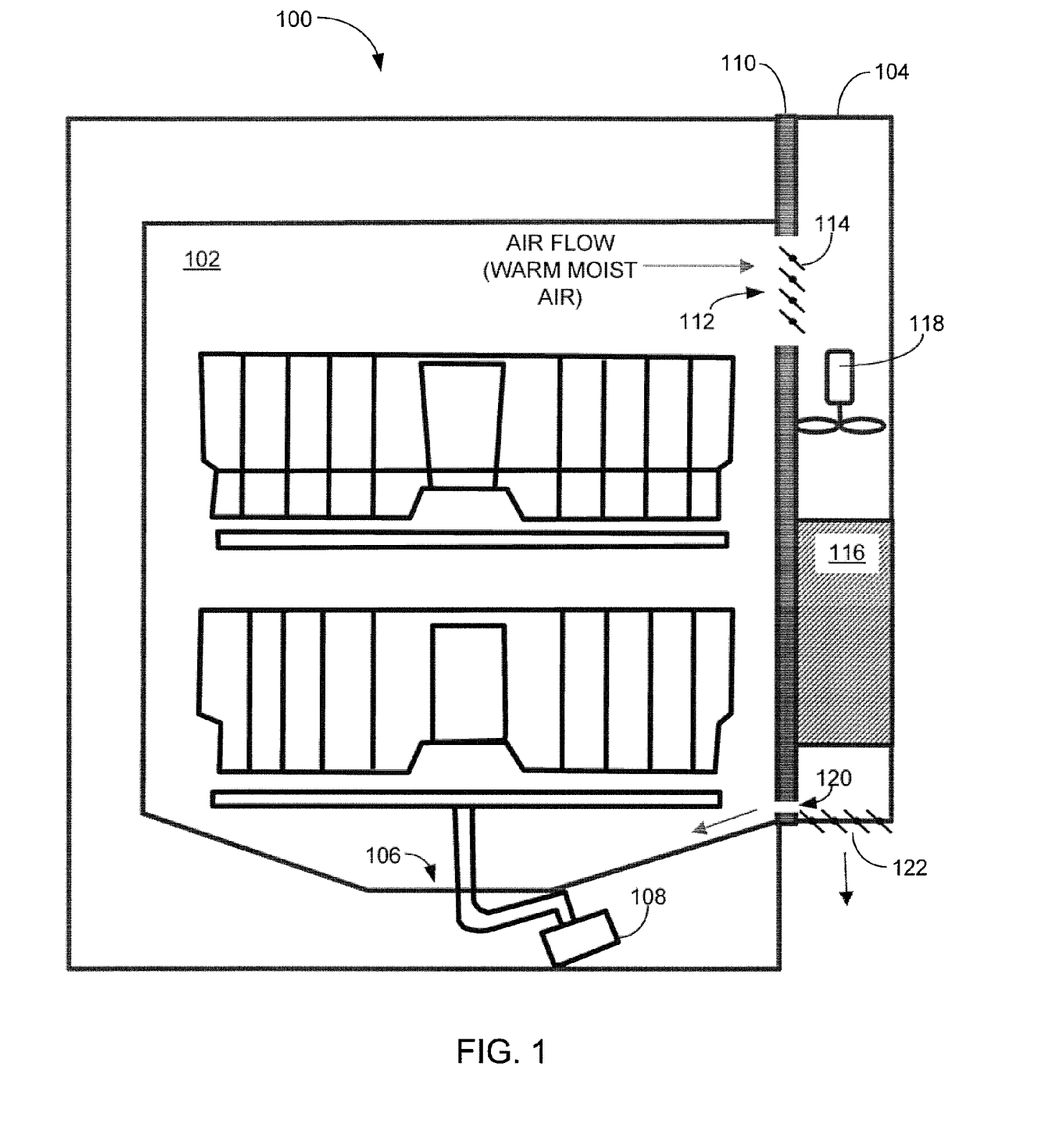
FIG. 1 illustrates a cross-sectional view of an example dishwasher including a thermal storage heat exchanger drying system according to this disclosure.

FIG. 1 illustrates a cross-sectional view of an example dishwasher 100 including a thermal storage heat exchanger drying system according to this disclosure. Those skilled in the art will recognize that, for simplicity and clarity, some features and components are not explicitly shown, including those illustrated in connection with later figures. Such features, including those illustrated in later figures, will be understood to be equally applicable to the dishwasher 100. It will be understood that all features illustrated in the figures may be employed in any of the embodiments described. Omission of a feature or component from a particular figure is for purposes of simplicity and clarity, and not meant to imply that the feature or component cannot be employed in the embodiments described in connection with that figure.

As shown in FIG. 1, the dishwasher 100 includes a tub 102, a door 104, a sump 106, and a main pump 108.

The tub 102 defines an enclosure in which soiled dishware is placed for washing and drying. The tub 102 has a bottom surface that generally slopes down toward a central portion of the tub 102, thereby allowing water to collect in the central portion. Positioned generally in the central portion, and generally coinciding with the lowest level of the bottom surface of the tub 102, is the sump 106. During a wash cycle, water sprayed into the tub 102 falls over the dishware and down into the sump 106, where it is input into the main pump 108 for recirculating. During a drain cycle, the water in the sump 106 is emptied into a drain (not shown) coupled to the sump 106.

The door 104 covers a vertical opening in the front of the tub 102. The door 104 includes thermal insulation 110, an air inlet 112, air dampers 114, a thermal storage heat exchanger 116, a fan 118, a condensate drain 120, and an air outlet 122.

The thermal insulation 110 is positioned adjacent to the tub 102 to reduce conductive heat transfer from the tub 102 to the door 104 and the ambient environment outside the dishwasher 100. As shown in FIG. 1, the thermal insulation 110 extends substantially from a top edge of the door 104 to a bottom edge of the door 104 and from a right edge to a left edge of the door 104 in order to minimize the conductive heat transfer. The thermal insulation 110 may include any suitable insulative material.

The air inlet 112 is an opening or passage through the external surface of the door 104 and the thermal insulation 110 into an internal cavity of the door 104. When the door 104 is closed on the dishwasher 100, the air inlet 112 allows air to flow between the tub 102 and the internal cavity of the door 104. The air dampers 114 are operable to open the air inlet 112 (thus allowing air flow between the tub 102 and the internal cavity of the door 104) or close the air inlet 112 (thus restricting the air flow). The air dampers 114 can be controlled by a mechanical actuator such as a solenoid that is programmed or otherwise configured to open or close the air dampers 114 at predetermined times or predetermined conditions. For example, the air dampers 114 could open or close at the start or end of a washing cycle, a rinsing cycle, or a drying cycle. As another example, the air dampers 114 could open or close based on a particular temperature or humidity level in the tub 102 or the internal cavity of the door 104.

At the end of a rinsing cycle, the air in the tub 102 typically has a temperature around 120° F. to 130° F. with a relative humidity of (or close to) 100%. In some dishwashers, when this hot and humid air is vented into the ambient, condensation can occur depending on the ambient temperature and humidity conditions, resulting in water condensate appearing on the floor or exterior surfaces of nearby furniture or appliances. Moisture will also often condense on dishes when it is left sitting inside the washing tub.

To address these and other issues, the door 104 includes the thermal storage heat exchanger 116 and the fan 118 positioned in the internal cavity of the door 104. The thermal storage heat exchanger 116 removes moisture from the hot and humid air before it is discharged into the ambient air outside the dishwasher 100 during the drying cycle. The thermal storage heat exchanger 116 can include a phase change material (PCM), a non-PCM, or both, as described in greater detail below. Depending on the embodiment, either the temperature of the non-PCM increases or the PCM changes phase (e.g., from solid to liquid) as the moisture from the air condenses on the surface of the thermal storage heat exchanger 116.

The fan 118 moves the air through the internal cavity of the door 104 and across the thermal storage heat exchanger 116. As shown in FIG. 1, the fan 118 is "upstream" of the thermal storage heat exchanger 116. However, in other embodiments, the fan 118 could be positioned after (or "downstream" from) the thermal storage heat exchanger 116. In such embodiments, operation of the fan 118 creates a low-pressure suction zone that draws air across the thermal storage heat exchanger 116. This may allow the air to flow more evenly across the thermal storage heat exchanger 116 compared to embodiments with the fan 118 positioned upstream of the thermal storage heat exchanger 116. Also, the use of a fan is merely one example. Other suitable air moving devices may also be used to move air through the internal cavity of the door 104. Examples of such devices can include suction pumps, pneumatic pumps, vortex airflow devices, and the like.

At the start of the drying process, the inlet air dampers 114 open and the fan 118 switches on. The hot and humid air is drawn from the tub 102 into the internal cavity of the door 104 by the fan 118. The air then passes through (or over or across) the thermal storage heat exchanger 116, which is initially at thermal equilibrium with the ambient surroundings of the dishwasher 100 and is at a temperature well below the dew point of the humid air in the tub 102. The lower temperature of the thermal storage heat exchanger 116 causes heat transfer to occur and causes the moisture in the humid air to condense on the surface of the heat exchanger 116. Relatively dry air is then discharged into the ambient through the air outlet 122 without condensation. The condensate that forms on the surface of the heat exchanger 116 may simply remain on the surface due to surface tension or may fall from the surface due to gravity. In some embodiments, the surface of the heat exchanger 116 may include a hydrophilic coating or surface treatment to encourage the condensate to move off of the surface. Condensate that falls from the surface of the heat exchanger 116 can drain back into the dishwasher tub 102 through the condensate drain 120, which includes an orifice or other opening in the door 104. In some embodiments, the condensate drain 120 can include a P-trap that prevents air from moving in or out through the drain hole. In some embodiments, the heat exchanger 116, the condensate drain 120, or both, can include antimicrobial properties to prevent or reduce odors.

The air outlet 122 is shown in FIG. 1 in a bottom surface of the door 104. This is merely one example; the air outlet 122 could be positioned in any other suitable location that is downstream from the air flow through the heat exchanger 116. In some embodiments, the air outlet 122 may include operable air dampers similar to the air dampers 114 at the air inlet 112. In other embodiments, the air outlet 122 may simply be vented without air dampers.

The thermal storage media used in the heat exchanger can be a PCM, a non-PCM, or a combination of the two. A PCM is configured to change its phase (e.g., from solid to liquid or from liquid to gas) as it absorbs heat from its surroundings, and is configured to restore to its ambient phase (e.g., from liquid to solid or from gas to liquid) as it releases heat back to the surroundings. A non-PCM does not change phase, but simply increases in temperature or decreases in temperature as it absorbs heat from or releases heat to its surroundings.

At the conclusion of the air drying process, the thermal storage heat exchanger 116 holds excess thermal energy (or heat). Depending on embodiment, the temperature of the non-PCM in the heat exchanger 116 is significantly increased, or the phase of the PCM is changed to liquid or gas. The heat exchanger 116 needs to be restored or "recharged" to its ambient condition so that it is ready for the next drying process. The recharging of the heat exchanger 116 is considered an "off-cycle" process because it occurs after the washing and drying cycles have ended, but before a new washing cycle begins. The recharging of the heat exchanger 116 can be performed by natural recharging or forced recharging.

In natural recharging, the heat exchanger 116 slowly gives up heat to the ambient air and surfaces in contact with the heat exchanger 116 (e.g., exterior walls of the door 104) primarily through conductive (and some convective) heat transfer after the drying cycle concludes. Eventually, the heat exchanger 116 reaches thermal equilibrium with its surroundings. During natural recharging, the fan 118 is off, and the air dampers 114 may be closed to prevent hot air from entering back into the tub 102.

In forced recharging, the fan 118 is switched on while the dishwasher 100 is idle. Air movement over the heat exchanger 116 results in convective heat transfer from the heat exchanger 116 to the moving air. The convective heat transfer is generally much faster than the primarily conductive heat transfer that occurs in natural recharging, and thermal equilibrium is therefore achieved sooner.

Figure 2:
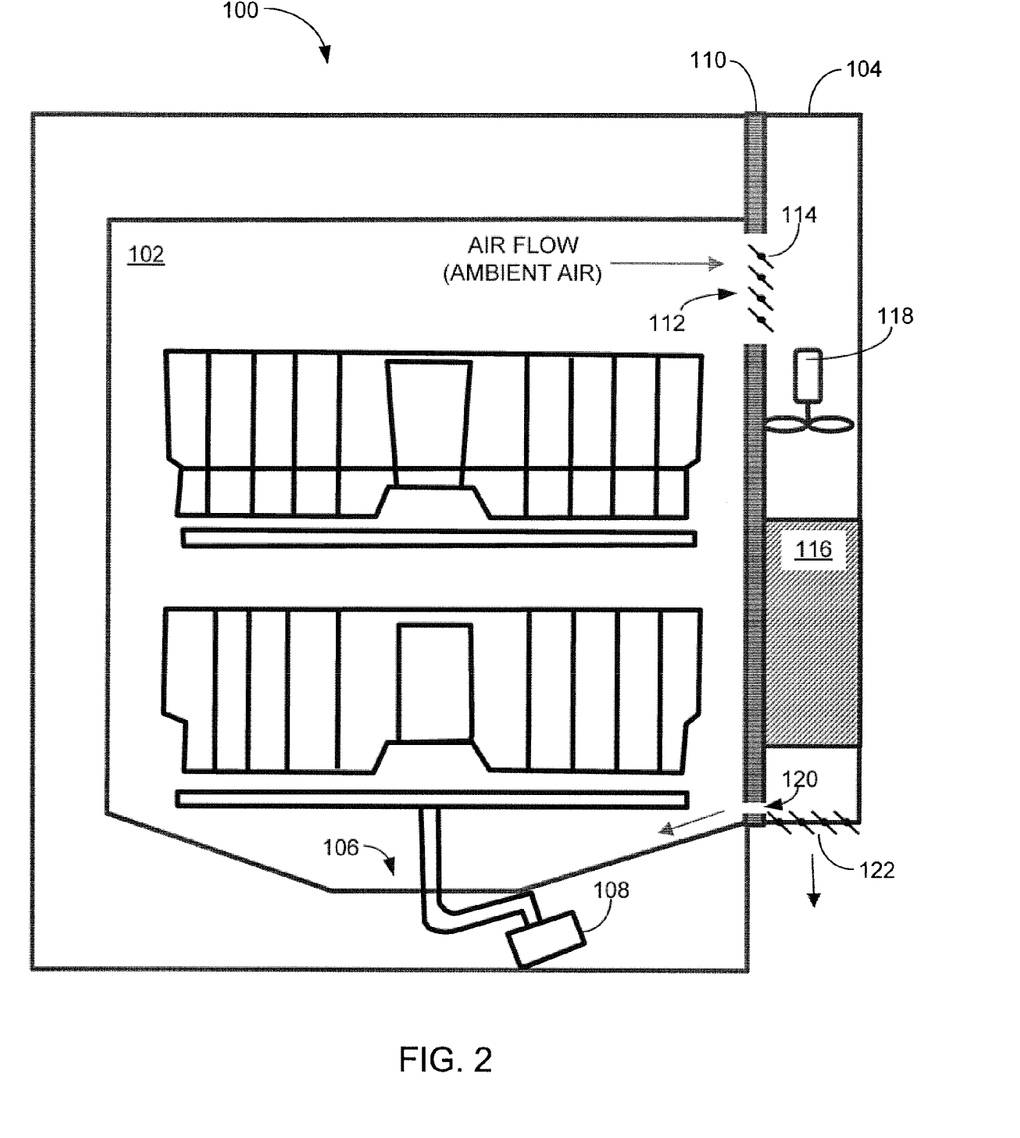
FIGS. 2 and 3 illustrate examples of forced recharging of a thermal storage heat exchanger drying system according to this disclosure.
Figure 3:
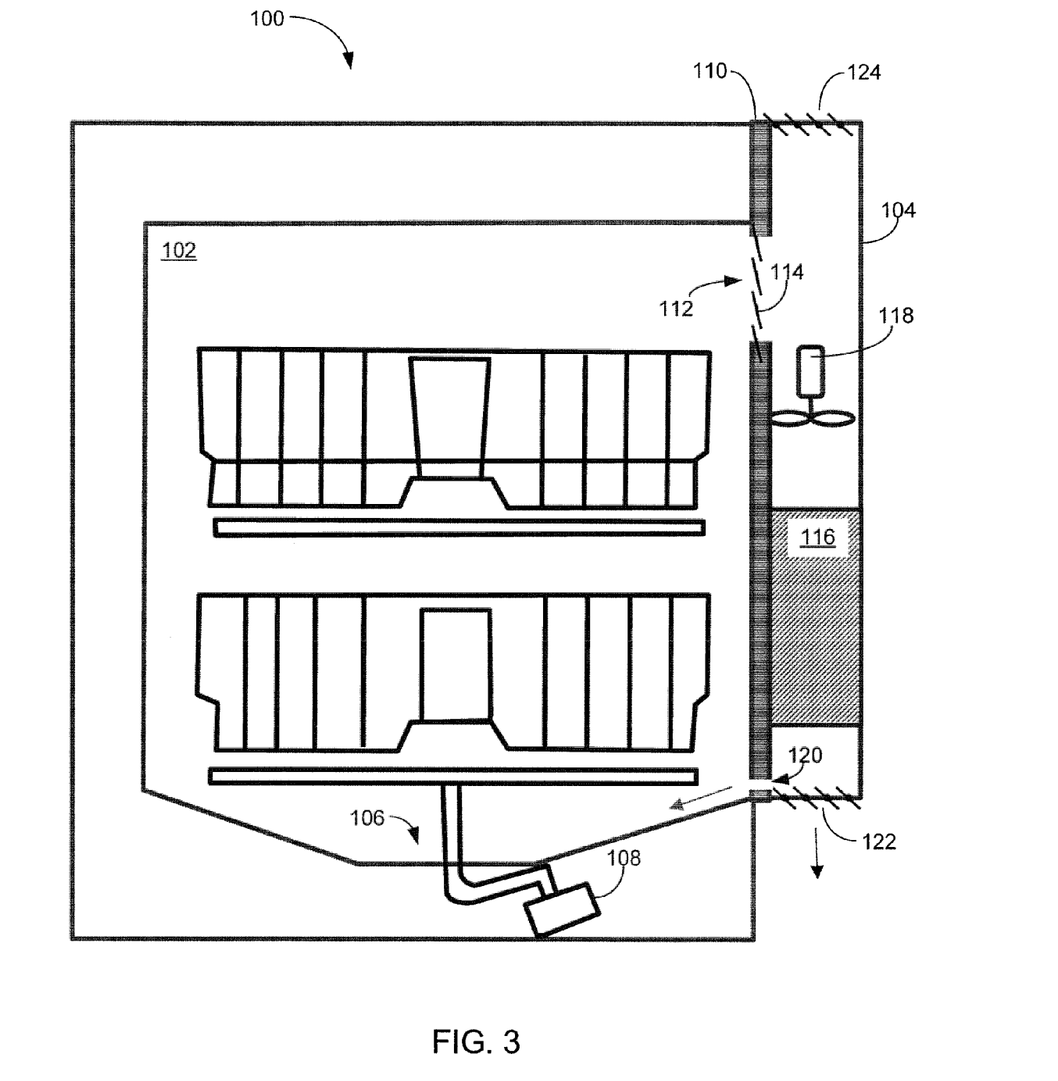

FIGS. 2 and 3 illustrate examples of forced recharging. In FIG. 2, the recharging process starts once the tub 102 is cooled down from the previous washing and drying cycle. Once the air in the tub 102 is cooled to approximately ambient temperature, the fan 118 is switched on and draws the ambient air from the tub 102 over the heat exchanger 116 to cool the heat exchanger 116. The air is then discharged out of the door 104 through the air outlet 122, the condensate drain 120, or both. The fan 118 may remain on until thermal equilibrium is achieved.

In FIG. 3, the dishwasher 100 includes an optional vent 124 disposed at or near the top of the door 104, such as on a top surface or at the top of the front surface. As shown in FIG. 3, during the forced recharging, the fan 118 is switched on and the air dampers 114 are closed. Ambient air from outside the dishwasher 100 is drawn through the vent 124 and over the heat exchanger 116 to cool the heat exchanger 116. The air is then discharged through the air outlet 122. The fan 118 may remain on until thermal equilibrium is achieved. Since the cooling air is drawn from outside the dishwasher, the forced recharging shown in FIG. 3 does not need to wait until the tub 102 and its contents cool to ambient temperature. Instead, the forced recharging can begin at any time after the drying process is finished.

As shown in FIGS. 1 through 3, the thermal storage heat exchanger 116 and fan 118 are disposed in the door 104 of the dishwasher 100. However, embodiments of the drying system are not limited to the dishwasher door 104. The drying system can alternatively be positioned at the top, back, bottom, or sides of the dishwasher.

Figure 4:
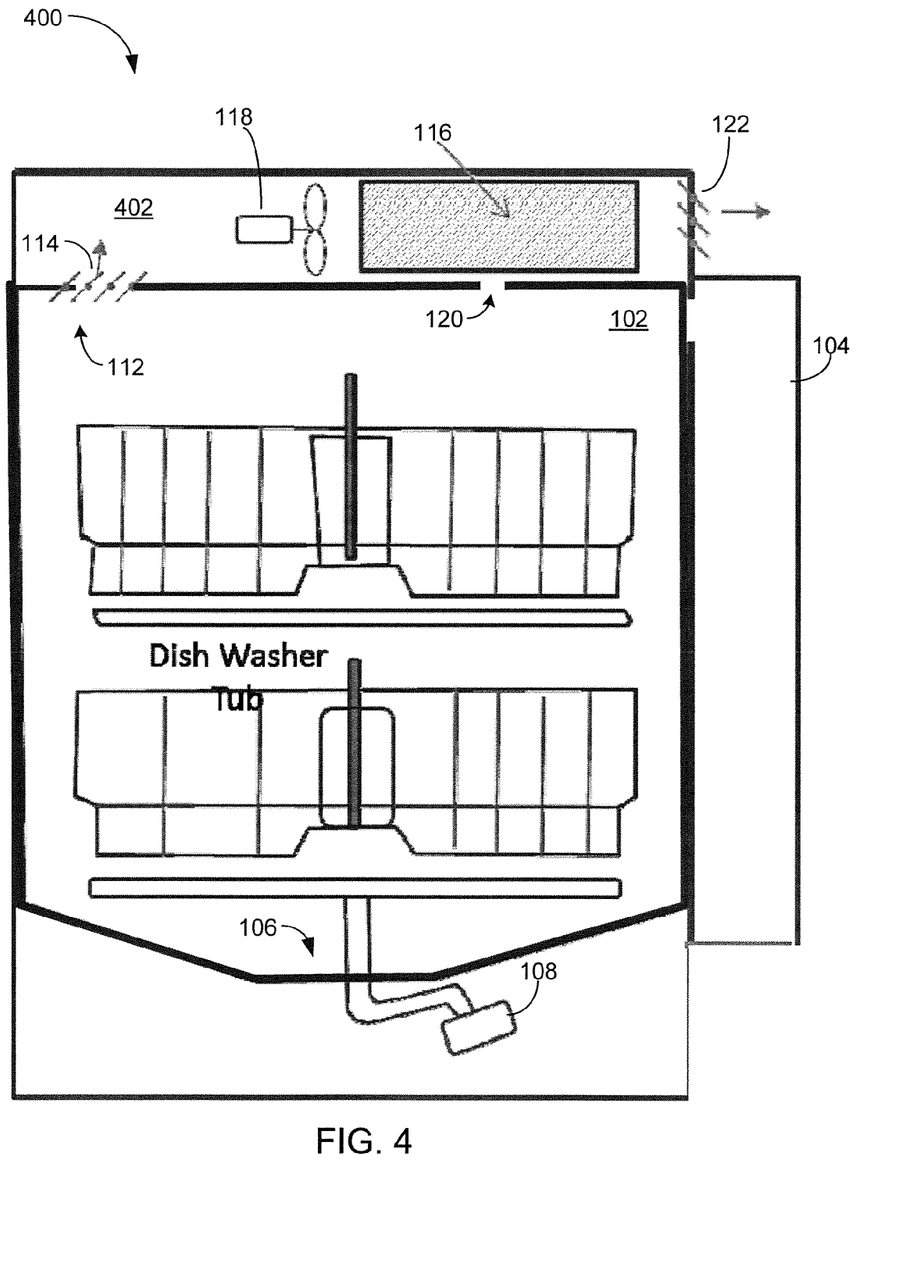
FIG. 4 illustrates a cross-sectional view of an example dishwasher including a thermal storage heat exchanger drying system that is disposed in a top portion of the dishwasher according to this disclosure; and
}

FIG. 4 illustrates a cross-sectional view of an example dishwasher 400 including a thermal storage heat exchanger drying system that is disposed in a top portion of the dishwasher 400 according to this disclosure. The dishwasher 400 shown in FIG. 4 includes many of the same components as the dishwasher 100 of FIG. 1; for the purposes of simplicity and clarity of the various embodiments, a detailed description of those elements are not repeated here.

As shown in FIG. 4, the dishwasher 400 includes a cavity 402 disposed above the tub 102 and below a top surface of the dishwasher 400. The thermal storage heat exchanger 116 and fan 118 are disposed in the cavity 402. Similar to the door 104 in FIG. 1, the cavity 402 includes the air inlet 112 and air outlet 122. During the drying and recharging operations, the fan 118 forces air through the cavity 402 and over the heat exchanger 116, thereby removing heat and humidity from the air (during the drying cycle) or removing heat from the heat exchanger (during the recharging process), similar to the processes described with respect to FIGS. 1 through 3.

Although FIGS. 1 through 4 illustrate different examples of dishwashers, various changes may be made to the figures. For example, the dishwashers shown can include any number of each component in any suitable arrangement. In general, dishwashers come in a wide variety of configurations, and FIGS. 1 through 4 do not limit the scope of this disclosure to any particular configuration(s). Moreover, while FIGS. 1 through 4 illustrate operational environments in which various drying features disclosed in this patent document can be used, these features can be used in any other suitable system.

FIGS. 5A through 7B illustrate different examples of thermal storage heat exchangers that can be used in embodiments of this disclosure. For example, any of the thermal storage heat exchangers 500, 600, 700 shown in FIGS. 5A through 7B can be incorporated into any of the dishwashers 100, 400 shown in FIGS. 1 through 4. The embodiments of the thermal storage heat exchangers shown in FIGS. 5A through 7B are for illustration only. Other embodiments of the thermal storage heat exchangers can be used without departing from the scope of this disclosure.

Figure 5A:
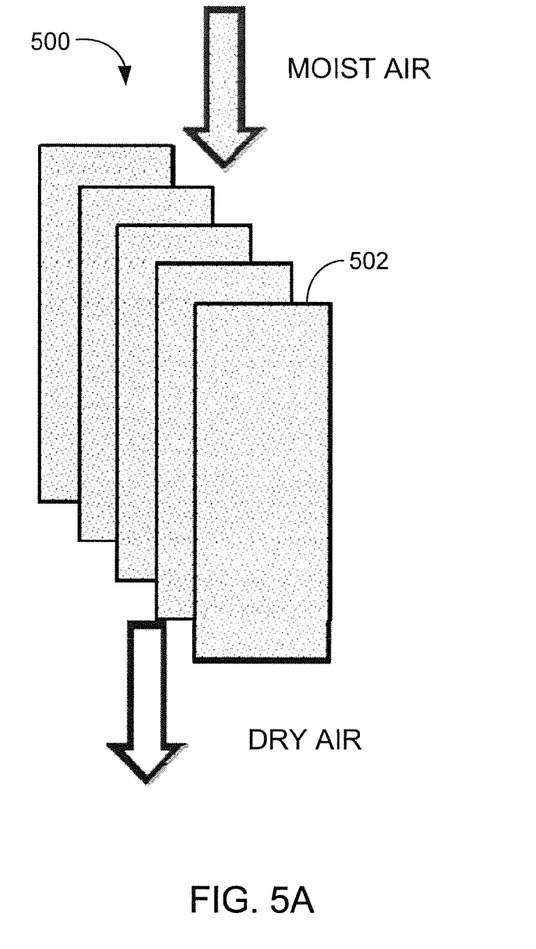
Figure 5B:
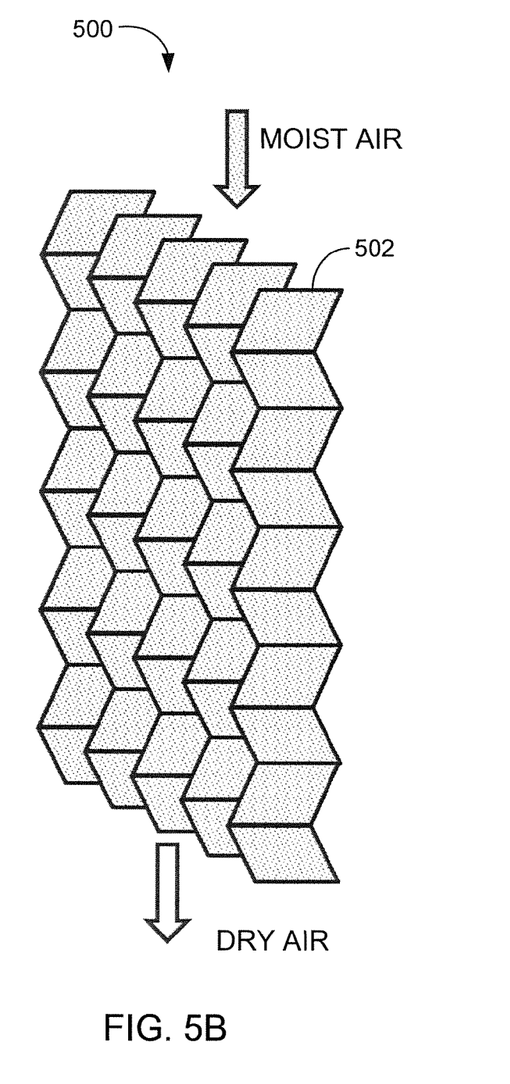

In FIGS. 5A and 5B, the thermal storage heat exchanger 500 is comprised of multiple metal fins 502. Each fin 502 includes one or more thin plates formed of one or more metals that have advantageous heat-conducting properties, such as copper or aluminum. As shown in FIG. 5A, the fins 502 are substantially rectangular and arranged in parallel. As shown in FIG. 5B, the fines 502 are comprised of multiple segments that are arranged in a wave pattern. In other embodiments, the fins 502 could have other shapes and arrangements, including slanted fins, fins at right angles or other angles to each other, overlapping baffles, curved (non-planar) fins or segments, or any other suitable shape(s) or arrangement(s) that allow for air to pass over, across, or through the thermal storage heat exchanger 500.

During the drying process, the fins 502 absorb heat from the moving air passing over and between the fins 502. The moisture in the humid air condenses and collects on the surfaces of the fins 502. The total number, mass, and areas of the metal plates comprising the fins 502 are selected such that the fins 502 have a heat capacity larger than the condensation heat for moisture and can condense the moisture at a desired rate.

Figure 6:
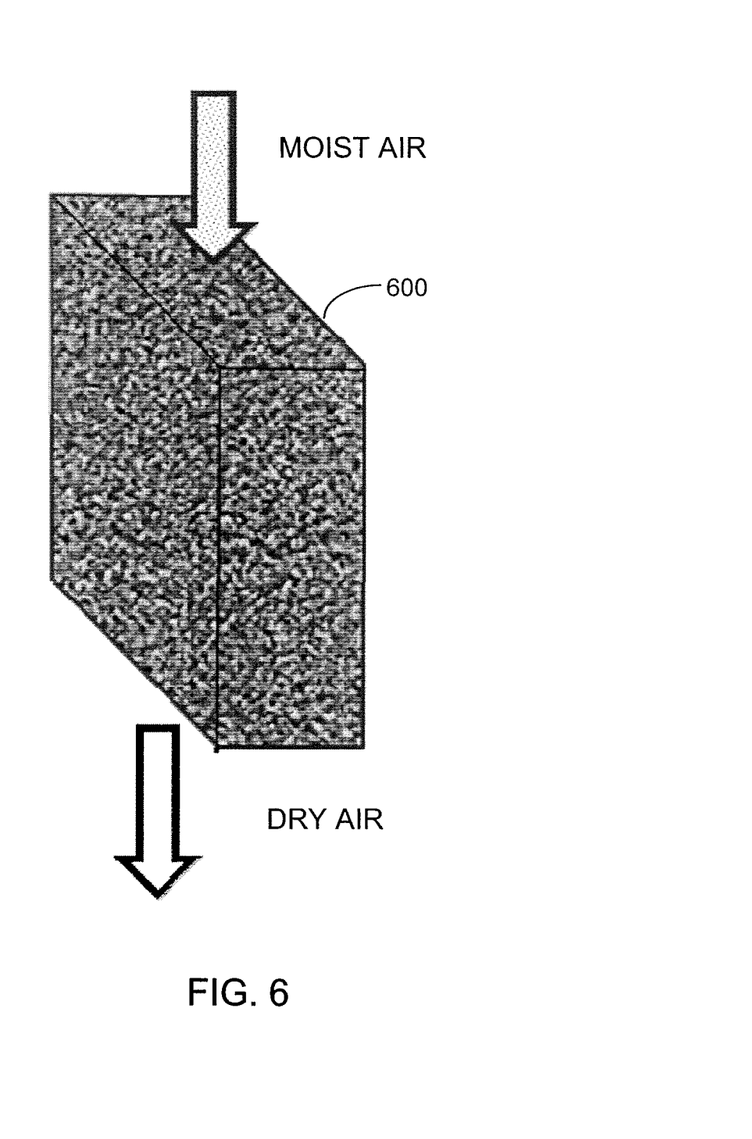

FIG. 6 illustrates another embodiment in which the thermal storage heat exchanger 600 is forming of one or more granulated materials, sponge-like materials, or a foam-like matrix. Such materials can include one or more metals, ceramics, and the like. During the drying process, the hot, humid air passes over and through the granules and/or voids in the sponge-like or foam-like materials of the thermal storage heat exchanger 600. The large combined surface area of the granules or voids in the thermal storage heat exchanger 600 promote rapid heat transfer from the air to the thermal storage heat exchanger 600.

Figure 7A:
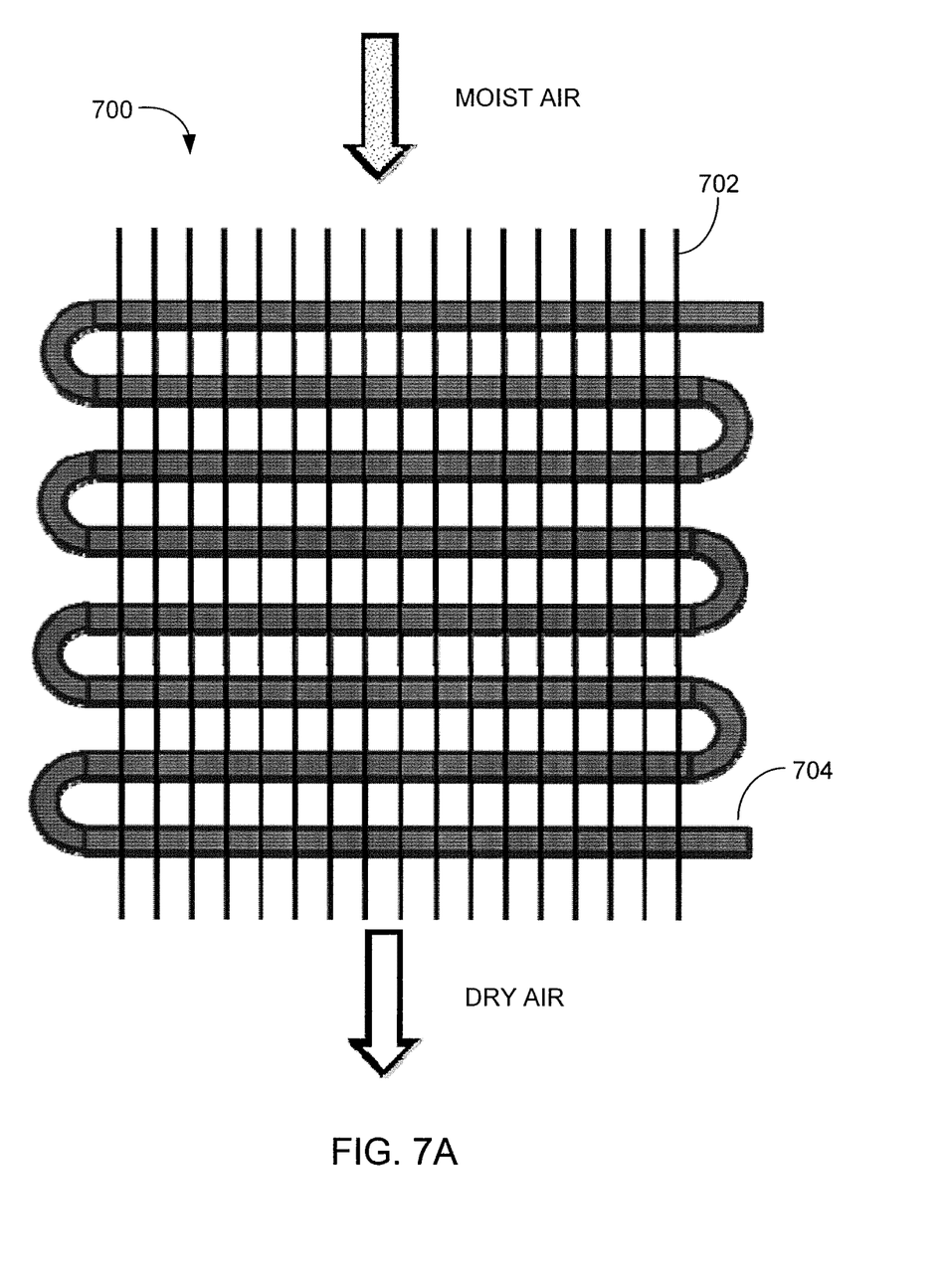
Figure 7B:
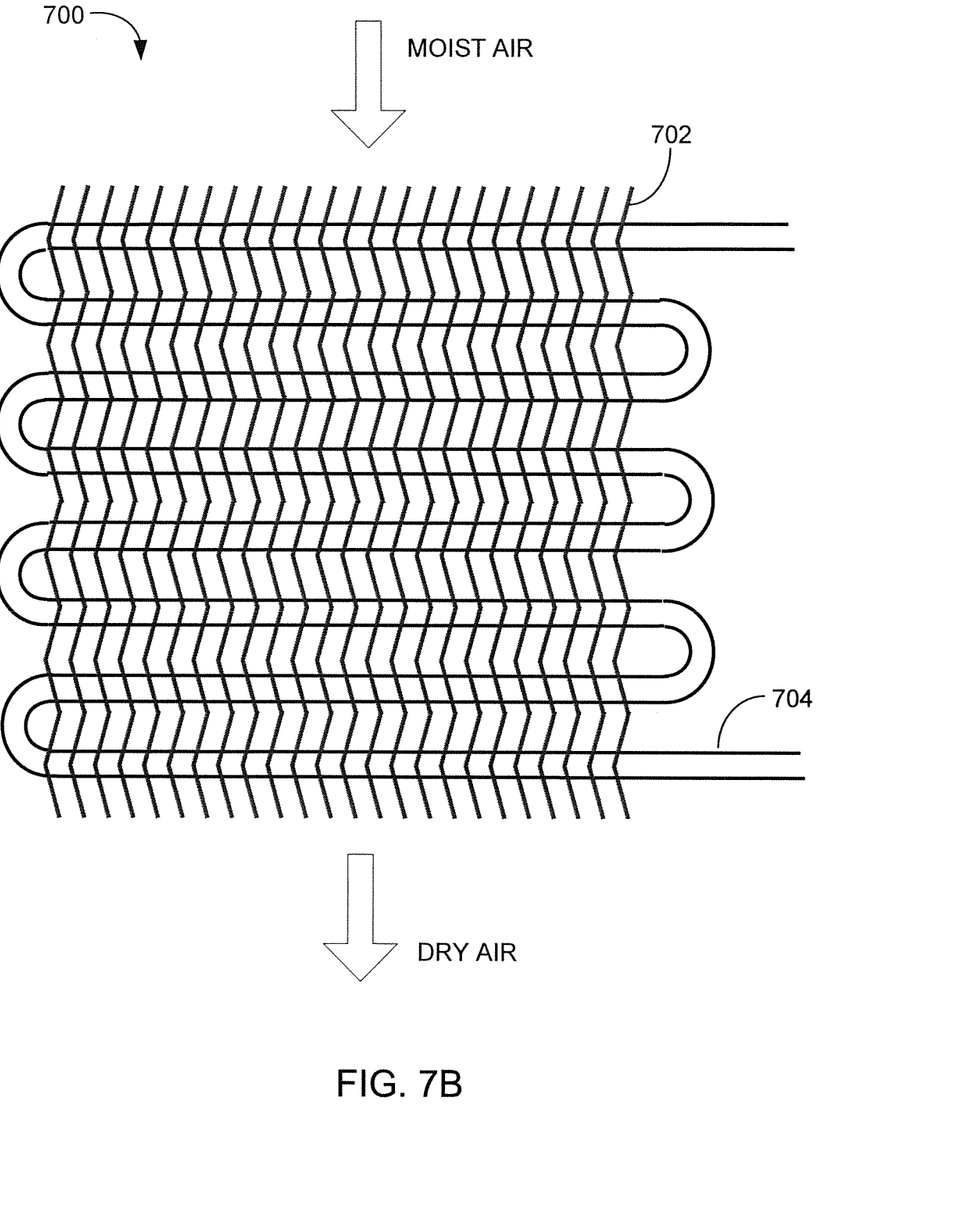

FIGS. 7A and 7B illustrates further embodiments in which the thermal storage heat exchanger 700 is a finned tube thermal storage heat exchanger sealed and filled with thermal fluid. As shown in FIGS. 7A and 7B, multiple metal fins 702 are coupled to a sealed tube 704 that contains thermal fluid. The tube 704 is shown in a serpentine configuration and the metal fins 702 are shown arranged in parallel. However, this is merely one example; other configurations and arrangements are possible. In some embodiments, the thermal fluid in the tube 704 can be a phase change material (PCM) with a melting point around ambient temperature. Using a PCM can significantly reduce the amount of thermal storage material needed and the overall weight of the system. One example of a suitable PCM material for the fluid in the tube 704 is paraffin. The metal fins 702 can be the same as or similar to the metal fins 502 of FIGS. 5A and 5B. For example, in FIG. 7A, the fins 702 are substantially rectangular and arranged in parallel, such as the fins 502 of FIG. 5A. In FIG. 7B, the fins 702 are arranged in a wave pattern, such as the fins 502 of FIG. 5B. However, these are merely examples, and the fins 702 could have other shapes and arrangements, including slanted fins, fins at right angles or other angles to each other, overlapping baffles, curved (non-planar) fins or segments, or any other suitable shape(s) or arrangement(s) that allow for air to pass over, across, or through the thermal storage heat exchanger 700.

Although FIGS. 5A through 7B illustrate different examples of thermal storage heat exchangers, various changes may be made to the figures. For example, the thermal storage heat exchangers shown can include any number of each component in any suitable arrangement, and FIGS. 5A through 7B do not limit the scope of this disclosure to any particular configuration(s). Moreover, while FIGS. 5A through 7B describe thermal storage heat exchangers for use in dishwashers, these features can be used in any other suitable device or system.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle. Use of any other tem', including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. §112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A dishwasher drying system comprising:
   an air inlet configured to receive hot, humid air from a tub of a dishwasher;
   an air outlet configured to discharge the air to an ambient environment outside the dishwasher;
   an air moving device configured to cause the air to move from the air inlet to the air outlet; and
   a thermal storage heat exchanger positioned within an airflow path of the moving air, the thermal storage heat exchanger configured to absorb heat and condense moisture from the moving air as the moving air contacts the thermal storage heat exchanger during a dishwasher drying cycle.

2. The dishwasher drying system of claim 1, wherein the thermal storage heat exchanger comprises a plurality of metal fins arranged in the airflow path.

3. The dishwasher drying system of claim 2, wherein the thermal storage heat exchanger further comprises a tube coupled to the plurality of metal fins, the tube containing a thermal material.

4. The dishwasher drying system of claim 3, wherein the thermal material is a phase change material that has a melting point around ambient temperature.

5. The dishwasher drying system of claim 4, wherein the phase change material comprises paraffin.

6. The dishwasher drying system of claim 1, wherein the thermal storage heat exchanger comprises one or more metal or ceramic materials in a foam, granule, or matrix configuration.

7. The dishwasher drying system of claim 1, wherein the dishwasher drying system is configured to operate in an off-cycle recharge operation during which the air moving device causes cooled air to move past the thermal storage heat exchanger, wherein the thermal storage heat exchanger is configured to discharge heat to the moving air as the moving air contacts the thermal storage heat exchanger.

8. The dishwasher drying system of claim 7, wherein the air inlet comprises a first air inlet, the dishwasher drying system further comprising a second air inlet configured to receive ambient air from the ambient environment outside the dishwasher, wherein the first air inlet is closed and the second air inlet is open during the off-cycle recharge operation.

9. The dishwasher drying system of claim 1, wherein the dishwasher drying system is disposed in a door of the dishwasher.

10. The dishwasher drying system of claim 1, wherein the dishwasher drying system is disposed above the tub of the dishwasher.

11. A dishwasher comprising:
   a tub;
   a door; and
   a dishwasher drying system comprising:
      an air inlet configured to receive hot, humid air from the tub;
      an air outlet configured to discharge the air to an ambient environment outside the dishwasher;
      an air moving device configured to cause the air to move from the air inlet to the air outlet; and
      a thermal storage heat exchanger positioned within an airflow path of the moving air, the thermal storage heat exchanger configured to absorb heat and condense moisture from the moving air as the moving air contacts the thermal storage heat exchanger during a dishwasher drying cycle.

12. The dishwasher of claim 11, wherein the thermal storage heat exchanger comprises a plurality of metal fins arranged in the airflow path.

13. The dishwasher of claim 12, wherein the thermal storage heat exchanger further comprises a tube coupled to the plurality of metal fins, the tube containing a thermal material.

14. The dishwasher of claim 13, wherein the thermal material is a phase change material that has a melting point around ambient temperature.

15. The dishwasher of claim 14, wherein the phase change material comprises paraffin.

16. The dishwasher of claim 11, wherein the thermal storage heat exchanger comprises one or more metal or ceramic materials in a foam, granule, or matrix configuration.

17. The dishwasher of claim 11, wherein the dishwasher drying system is configured to operate in an off-cycle recharge operation during which the air moving device causes cooled air to move past the thermal storage heat exchanger, wherein the thermal storage heat exchanger is configured to discharge heat to the moving air as the moving air contacts the thermal storage heat exchanger.

18. The dishwasher of claim 17, wherein the air inlet comprises a first air inlet, the dishwasher drying system further comprising a second air inlet configured to receive ambient air from the ambient environment outside the dishwasher, wherein the first air inlet is closed and the second air inlet is open during the off-cycle recharge operation.

19. The dishwasher of claim 11, wherein the dishwasher drying system is disposed in the door of the dishwasher.

20. The dishwasher of claim 11, wherein the dishwasher drying system is disposed above the tub of the dishwasher.

\* \* \* \* \*